US006796495B2

(12) United States Patent
Stahl et al.

(10) Patent No.: US 6,796,495 B2
(45) Date of Patent: Sep. 28, 2004

(54) SEATBACK HAVING REMOVABLE INTERFACE FOR USE IN PROVIDING COMMUNICATION ON-BOARD A MOBILE PLATFORM

(75) Inventors: Robert Stahl, Corona, CA (US); Daniel D. Poblete, Lake Forest, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/951,044

(22) Filed: Sep. 12, 2001

(65) Prior Publication Data

US 2003/0047598 A1 Mar. 13, 2003

(51) Int. Cl.[7] .................................................. G06K 5/00
(52) U.S. Cl. ...................... 235/380; 235/381; 235/382; 235/384
(58) Field of Search ................................. 235/380, 375; 379/438, 144, 440; 395/214; 340/5.66; 370/465, 352; 455/557, 554; 348/8; 707/205

(56) References Cited

U.S. PATENT DOCUMENTS

| | | | | |
|---|---|---|---|---|
| 4,811,387 A | * | 3/1989 | Hollewed et al. | 235/482 |
| 5,128,993 A | * | 7/1992 | Skowronski | 379/419 |
| 5,173,936 A | * | 12/1992 | Ditzig et al. | 379/370 |
| 5,311,302 A | | 5/1994 | Berry et al. | |
| 5,590,373 A | * | 12/1996 | Whitley et al. | 710/8 |
| 5,642,485 A | * | 6/1997 | Deaton et al. | 705/14 |
| 5,835,127 A | * | 11/1998 | Booth et al. | 725/76 |
| 5,864,559 A | * | 1/1999 | Jou et al. | 370/250 |
| 5,913,174 A | * | 6/1999 | Casarez et al. | 455/557 |
| 6,002,944 A | * | 12/1999 | Beyda | 379/374 |
| 6,188,309 B1 | * | 2/2001 | Levine | 235/380 |
| 6,266,017 B1 | * | 7/2001 | Aldous | 343/702 |
| 6,438,124 B1 | * | 8/2002 | Wilkes et al. | 370/352 |
| 6,480,864 B1 | * | 11/2002 | Fong et al. | 707/205 |

FOREIGN PATENT DOCUMENTS

EP          0 739 816 A      10/1996
WO         WO 00 14987      3/2000

OTHER PUBLICATIONS

Patent Cooperation Treaty International Search Report, International Application No. PCT/US 02/28287, Dec. 2, 2002, 3 pgs.

Kelly E., "SIA to Trial Latest Interactive System from Matsushita" Flight International, Reed Business Information, Hawards Heath, G.B., vol. 159, No. 4765, Jan. 30, 2001, p. 35.

Kelly E., "SAS Commits to Wireless Tenzing In–Flight E–Mail Internet Test", Haywards Heath, G.B., vol. 159, No. 4765, Jan. 30, 2001, p. 35.

Kelly E., "Spinning an Airborne Web" Flight International, Reed Business Information, Haywards Heath, G.B., vol. 158, No. 4746, Sep. 12, 2000, pp. 48–50.

Jennifer Michels, "The last great frontier", TECHWAY, Mar. 26, 2001, Retrieved online at: URL:http://techway.washtech.com/news/2_6/moretech/8379_1.html.

Dirk Spiers: "You've Got Airmail" the conference spy, Jun. 21, 2001, Retrieved online at: URL:www. business2.com/articles/web/0,1653,12422,00.html.

Steven Meloan, "Java Technology Takes The Sky" JAVA-.SUN.COM, Nov. 22, 2000, Retrieved online at: URL:http://java.sun.com/features/2000/11/air.html.

* cited by examiner

*Primary Examiner*—Diane I. Lee
*Assistant Examiner*—Kumiko C. Koyama
(74) *Attorney, Agent, or Firm*—Harness, Dickey & Pierce, P.L.C.

(57) ABSTRACT

An assembly for quickly and efficiently distributing PC cards while in-transit for accessing a system on-board a mobile platform to communicate therewith. The assembly may be included as part of a seatback and includes a portion for securedly maintaining the PC card therein until payment is made using a credit card or similar payment card. The credit card is inserted within the assembly for processing and once approved, the PC card may be removed. The credit card is held and not returned until the PC card is replaced.

12 Claims, 3 Drawing Sheets

SEATBACK HAVING REMOVABLE INTERFACE FOR USE IN PROVIDING COMMUNICATION ON-BOARD A MOBILE PLATFORM

FIELD OF THE INVENTION

The present invention relates generally to a system for providing an interface, such as a PC card, to access a system or network on-board a mobile platform, and more particularly to such a system implemented in connection with a seat on-board the mobile platform.

BACKGROUND OF THE INVENTION

The use of portable electronic devices (e.g., laptop computers) while in-transit, such as while in-flight, is increasing. However, until recently the resources available while in-transit were limited. Typically access is provided only to local information within the portable electronic device (i.e., on a laptop hard drive). Limited electronic communication is also possible using a telephone system on-board the mobile platform. Use of the on-board telephone is not only tedious, particularly when used in connection with a portable electronic device (e.g., sending emails), but costly to operate. Any other electronic information (e.g., in-flight movies) available on-board the mobile platform is only provided via on-board screens and similar devices.

Providing increased communication capabilities while on-board a mobile platform, including accessing more electronic resources, is of increasing importance. In particular, because portable electronic devices are used to perform many everyday tasks, including, for example, work related tasks, providing electronic communication while in-transit is increasingly critical. For example, communication while in-transit is virtually a must for many business people.

A system for providing increased electronic communication capabilities and other electronic resources while on-board an aircraft is the Connexion by Boeing™ system from the Boeing Company. This system provides access to the Internet and other electronic resources (e.g., email) while on-board a mobile platform, such as an aircraft. However, in order to access the system, a properly configured portable electronic device must be used, which must include an appropriate interface to communicate with the system. Such an interface may be provided via, for example, a USB port or a Local Area Network (LAN) connection. Typically, the portable electronic device is pre-configured to access the system using the specific interface. However, often configuration might not be properly provided (e.g., improper software or device driver install) or other incompatibilities may exist that prevent access to the system. Further, a portable electronic device may not include a particular interface (e.g., wireless LAN PC card) needed to access the on-board system.

Thus, there exists a need for a system that conveniently provides a removable interface for use by portable electronic devices to access systems on-board mobile platforms. In particular, such a system should be easy to operate and provide the needed connectivity for accessing the on-board system.

SUMMARY OF THE INVENTION

The present invention generally provides a system and method for conveniently distributing an interface (e.g., a PC card) to use in connection with a portable electronic device (e.g., laptop computers) while in-transit. The interface when connected to the portable electronic device provides communication with systems on-board the mobile platform to thereby access on-board services (e.g., the Internet).

Specifically, an assembly and method of the present invention provides for obtaining access to a removable interface (e.g., PC card) while on-board a mobile platform (e.g., an aircraft). An assembly of the present invention is preferably provided as part of the seatback of seats within the mobile platform. The assembly is adapted for securely holding at least one removable interface therein. Means for accepting payment, including, for example, a payment card reader for reading a payment card to be processed, is provided to authorize use of the interface upon approval of the payment card. Upon approval of the payment card, the interface is released from the assembly for use. The payment card is maintained within the assembly until the interface is replaced. Multiple interfaces may be securely held within the assembly.

Indication lights or similar members may be provided to indicate if and when payment is approved. Further, specific instructions for obtaining access to the interface are also provided. Timing means may be provided to determine the amount of time the interface was removed from the assembly, with the payment charged accordingly.

A seat on a mobile platform adapted for providing a PC card (e.g., PCMCIA LAN card) for use with a portable computer to access a system on-board the mobile platform may also be provided. The seat includes a credit card reader on a back of the seat for approving a credit card inserted therein to obtain access to the PC card and adapted to hold the credit card until the PC card is returned. A recessed portion for holding the PC card on the back of the seat is also included with the recessed portion adapted for locking the PC card therein until the credit card is approved. The credit card reader and recessed portion are together adapted for implementation on a top portion of the back of the seat. At least one indication light may be provided for indicating the status of credit card approval. Further, printed instructions may be included for providing guidance in obtaining access to the PC card. A plurality of credit card readers and recessed portions may be provided in connection with each seat.

A method in accordance with the present invention may also be provided to obtain access to a PC card while on-board a mobile platform. The method includes accepting payment in order to obtain the PC card, wherein the payment is provided using a payment card, processing the payment card to authorize use of the PC card, providing the PC card for use in accessing the system on-board the mobile platform upon approval of the payment card, retaining the payment card until the PC card is returned and releasing the payment card upon return of the PC card. Indication of approval of the payment may be provided. Further, instructions may be included for providing guidance in obtaining access to the PC card.

Thus, the present invention provides an assembly and method for easily distributing an interface for accessing a system on-board a mobile platform. The assembly may be provided as part of seatbacks within the mobile platform and includes means for accepting payment, using, for example, a credit or debit card, in order to gain access to the interface. The credit or debit card is held and only released upon return of the interface.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. Thus, although the application of the present invention as disclosed herein is generally directed to an assembly configured in a particular manner as part of a seatback for distributing a specific interface, it is not so limited, and the present invention may be configured differently for use with different interfaces.

Figure 1:
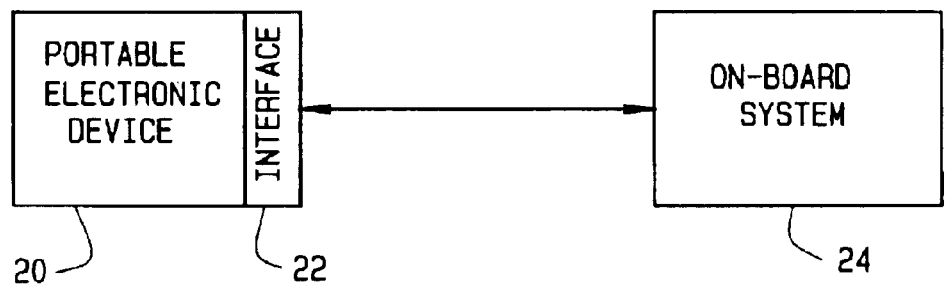
FIG. 1 is a simplified block diagram showing a portable electronic device in communication with an on-board system.
Figure 2:
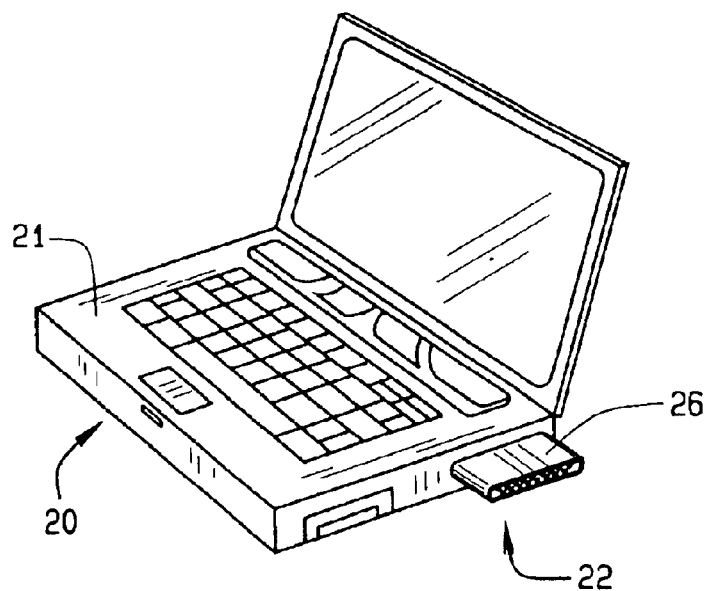
FIG. 2 is a perspective view of an exemplary portable electronic device in connection with which the present invention may be provided.

With respect to accessing an on-board network or system with a portable electronic device, and in particular using interfaces communicating with the on-board network or system, this may be further understood with reference to FIGS. 1 and 2 by example. Thus, before further describing the invention, it is useful to understand the manner in which communication is generally provided with respect to an on-board network or system and the interfaces for use therewith that may be provided on-board a mobile platform according to the present invention.

In general, in order to access a system or network to provide electronic communication, an appropriate interface must be provided. The interface allows for connectivity (i.e., communication link) between a portable electronic device and the system. For example, and as shown in FIG. 1, a portable electronic device 20 (e.g., laptop computer) with an interface 22 (e.g., LAN PC card) is configured to provide bi-directional communication with an on-board system 24, such as, for example, to access Internet services from the on-board system 24 while on-board an aircraft. In an aircraft environment, the on-board system 24 may be adapted to provide electronic communication and information. The electronic information may include, for example, Web-based content providing destination information (e.g., current weather, news, etc.) for a particular area, or entertainment content (e.g., movies, music, etc.) for viewing by passengers on the portable electronic device 20.

Generally, appropriate software, including configuration files and drivers must be installed within the portable electronic device 20 to provide connection to the on-board system 24 via the interface 22. Typically, the specific hardware of the portable electronic device 20 is determined in order to install the proper software for providing compatible communication with the on-board system 24. During the installation process, a specific interface 22 (e.g., LAN PC card) provided as part of the portable electronic device 20 (i.e., inserted within a Personal Computer Memory Card International Association (PCMCIA) slot) is selected to provide communication with the on-board system 24 and configured accordingly.

In particular, and for example, the portable electronic device 20 may be a laptop computer 21 as shown in FIG. 2. In order to provide communication with external systems and networks (i.e., on-board system 24), an interface 22 or similar communication device must be provided as part of the laptop 21. This may include an interface 22 provided as a permanent part of the laptop computer 21 (e.g., modem integrated within the laptop 21) or as a separate unit 26 (e.g., LAN PC card) adapted for removable connection to the laptop computer 21. In particular environments, a specific type of interface 22 may be required or preferable. For example, in an aircraft environment it may be more preferable to provide wireless communication with the on-board system 24 to avoid the need for using cables, wires or other connection members to communicate with the on-board system 24. When using a laptop computer 21, such wireless communication may be provided with, for example, a wireless LAN PC card. It should be noted that when accessing a local network or system, such as while on-board an aircraft, other types of interfaces 22 (e.g., non-wireless LAN PC card) may be used if compatible, such that an appropriate connection is provided on-board the mobile platform.

Having described exemplary interfaces 22 for use in connection with portable electronic devices 20 to communicate with on-board systems 24, the present invention provides an assembly and method for distributing interfaces 22 on-board a mobile platform while in-transit for use in communicating with the on-board system 24. Shown in exemplary form in FIGS. 3 and 4 for use in, for example, an aircraft environment, is an assembly of the present invention provided as part of the seats in a mobile platform.

Figure 3:
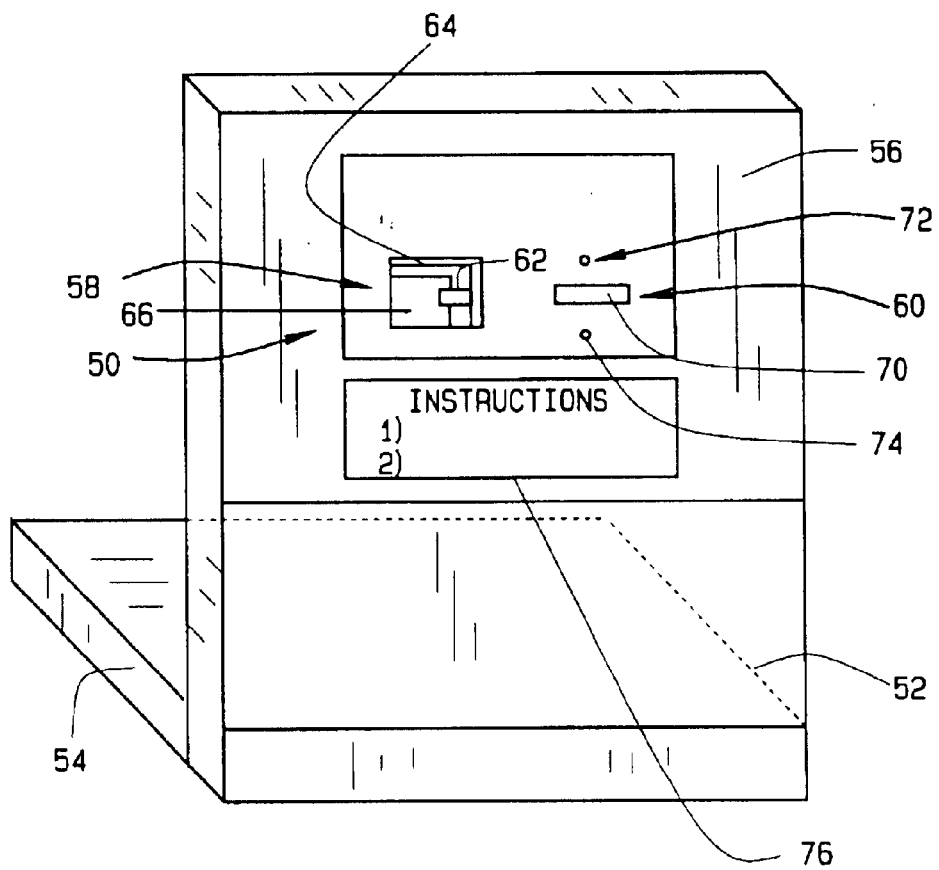
FIG. 3 is a perspective view of a seatback having an assembly constructed according to the principles of the present invention for providing an interface while on-board a mobile platform.

More specifically, and as shown in FIG. 3, an assembly 50 of the present invention is provided on a back portion 52 of a seat 54 of the mobile platform, which in the exemplary form shown is an aircraft seat. It should be noted that the assembly 50 may be constructed as an integral part of the seat 54, or alternately, may be provided as a module or other separate member for installation into the back portion 52 of the seat 54. Further, although in this exemplary form the assembly 50 is provided as part of a seat 54, it is not so limited and may be provided in connection with other parts of a mobile platform, including different mobile platforms. For example, the assembly may be provided as part of tables on-board a cruise ship or as part of seats in a tour bus. Additionally, although the assembly 50 is shown as part of an upper portion 56 of the back portion 52 of the seat 54, the assembly 50 may be provided in different locations on the seat 54 as required by, for example, the particular seat 54 configuration.

As shown in FIG. 3, an assembly constructed according to the principles of the present invention generally includes an interface holder portion 58 for removably holding an interface 22, such as a PC card 26, therein, and a payment receiving portion 60 for receiving payment, such as a payment card (e.g., credit card) to be processed to authorize use of the interface 22. The interface holder portion 58 includes a locking member 62 for securedly maintaining an interface 22 within a recessed area 64 or other similarly configured member of the interface holder portion 58. The recessed area 64 and locking member 62 may be provided in any suitable manner and configuration depending upon the specific interface 22 to be provided. For example, depending upon the dimensions of the interface 22, the recessed portion 64 may be configured accordingly. As shown in FIG. 3, the recessed area 64 is configured to securely maintain a PC card 66 (e.g., wireless LAN PC card) therein.

Figure 4A:
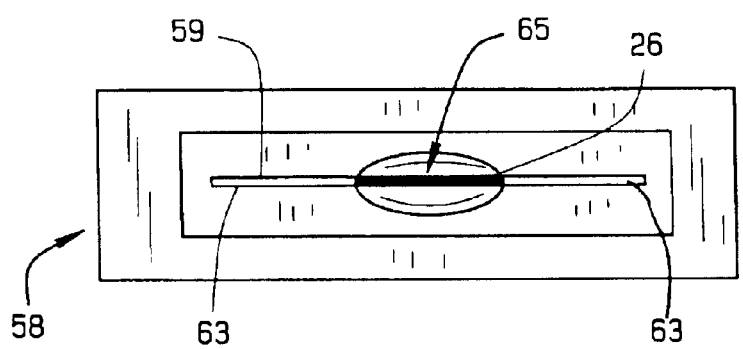
FIGS. 4(a) and 4(b) are front elevation views of an interface holder portion of an assembly of the present invention.
Figure 4B:
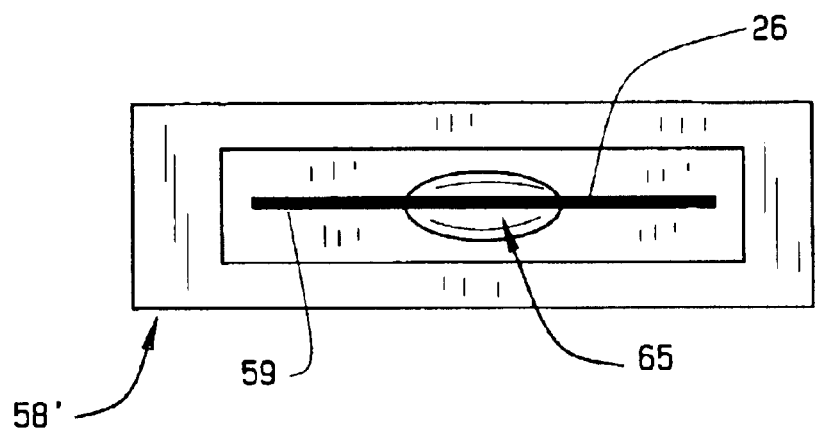

In another construction, as shown in FIGS. 4(*a*) and 4(*b*), the interface holder portion 58' includes a slot 59 for holding a PC card 26 therein that is inserted and removed through an opening 61. In this construction, the locking member 62 may be, for example, a solenoid activated access door 63. More preferably, a cut-out or indented portion 65 is provided to allow for visual confirmation that a PC card 26 is within the holder portion 58' as shown in FIG. 4(*a*). The cut-out or indented portion 65 also facilitates access to remove the PC card 26. In operation, upon approval of a payment card, the door 63 will move from a closed to an open position as shown in FIG. 4(*b*) (i.e., using a solenoid) to allow for removal of the PC card 26.

The payment receiving portion 60 includes a payment card reader (not shown), or other means for accepting payment (i.e., system for accepting cash or electronic payment), which may be provided using any suitable device, such as, for example the model MSR 140 Series Insertion Magnetic Strip Reader sold by Tyner. A slot 70 or other suitable opening or member for inserting a payment card (e.g., credit card) therein is also provided. Alternately, and for example, a payment card reader adapted for accepting a payment card swiped therethrough may be provided. Further, a system for processing a payment card inserted into the payment card reader through the slot 70 may be provided using any suitable device, and may include a payment card processing system, such as sold by EPAX.

With reference still to FIG. 3, an authorized light 72 and an unauthorized light 74 may each be provided to indicate whether payment provided using a payment card processed by the payment card processing system has been approved (e.g., credit card charged). Instructions 74 may be provided to assist a user in operating the assembly 50 to obtain access to the PC card 66. In a more preferred embodiment, instructions 74 such as the following may be provided to direct a user as to the procedure to follow to access the PC card 66:

(1) Insert credit card for authorization
(2) Wait for authorized light to illuminate and remove PC card 66
(3) If unauthorized light illuminates, try again or try another credit card
(4) Replace PC card 66 for return of credit card It should be noted that additional information may be provided in connection with the instructions 74, such as, for example, the cost for using the PC card 66.

Figure 5:
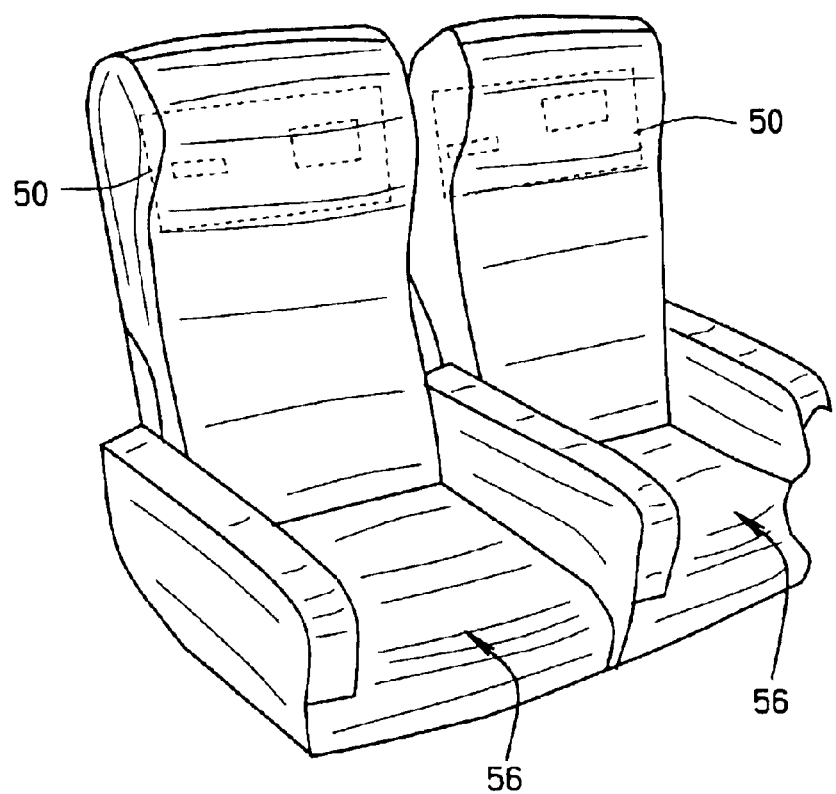
FIG. 5 is a perspective view of multiple seats having an assembly of the present invention provided therewith on the seatbacks.

In one embodiment, a separate assembly 50 may be provided on the back portion 52 of each seat 54 in a mobile platform as shown in FIG. 5. Alternately, a single assembly 50 may be provided for a set of seats in each row, such as, for example, one assembly 50 for each set of seats separated by an aisle in a row. However, other combinations are possible depending upon the particular needs and configuration of the specific aircraft (e.g., Boeing®747® versus Boeing 777® aircraft).

It should be noted that although the interface holder portion 58 and payment receiving portion 60 shown in FIG. 3 are configured in a particular manner, other configurations are contemplated. For example, a PC card 66 may be maintained in a vertical or horizontal position. Further, more than one PC card 66 may be maintained in the interface holder portion 58.

In operation, for example on-board an aircraft, a user inserts a credit card into the opening 70 of the payment receiving portion 60 for processing using the payment card reader and payment card processing system. If the credit card is approved, the user is authorized to remove the PC card 66 from the interface holder portion 58 for use in connection with a laptop computer for communicating with the on-board system 24. The illuminated authorized light 72 preferably indicates approval of the credit card.

In a more preferred embodiment, the locking member 62 is released for accessing the PC card 66 upon approval of the credit card. With the interface holder portion 58 as shown in FIG. 3, a user may be required to move the locking member 62 from a locked closed position to an unlocked open position upon credit card approval. As shown in another exemplary construction in FIGS. 4(*a*) and 4(*b*) as described herein, the interface holder portion 58' may include an access door 63 that is solenoid activated, and is thereby moved to an open position. Once removed, the PC card 66 may be inserted within a PCMCIA slot of a portable computer for accessing the on-board system 24. For example, the PC card may be a wireless LAN PC card 66 for communicating with the on-board system 24. The credit card is preferably held within the payment receiving portion 60 until the PC card 66 is replaced within the interface holder portion 58 and the locking member 62 placed in the locked closed position. If an access door 63 is provided, for example, in the interface holder portion 58', the access door 63 is moved to a closed position by a solenoid (i.e., magnetic operation)

If the credit card is not authorized, the unauthorized light 74 is illuminated and the credit card may again be inserted into the opening 70 for another attempted processing, or alternately, another credit card may be inserted. Depending upon the requirements of the on-board system 24, the assembly 50 may be provided with a timer or other suitable device to determine the amount of time the PC card 66 is removed from the interface holder portion 58, 58'. This time period may be used to charge an appropriate fee to the credit card. Alternately, a one-time charge may be provided.

Thus, the present invention provide a simple and convenient system for distributing interfaces for use in connection with portable electronic devices to access systems on-board a mobile platform. Although the present invention has been described in connection with an assembly and method in a seatback for providing PC cards for use on-board an aircraft to access an on-board system, it is not so limited, and the present invention may be provided on different mobile platforms (e.g., cruise ships or tour buses) in any suitable location therein to provide interfaces for accessing different systems.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A seat on a mobile platform adapted for providing a Personal Computer (PC) card for use with a portable computer to access a system on-board the mobile platform, the seat comprising:

a payment card reader on a back of the seat for approving a payment card inserted therein to obtain access to the PC card and adapted to hold the payment card until the PC card is returned; and a recessed portion for holding the PC card on the back of the seat, the recessed portion adapted for locking the PC card therein unto the payment card is approved, the PC card having stored therein configuration information for use by the portable electronic device to allow communication through the PC card between the portable electronic device and the system on-board the mobile platform.

2. The seat according to claim 1, wherein the payment card reader and recessed portion are together adapted for implementation on a top portion of the back of the seat.

3. The seat according to claim 2, further comprising at least one indication light for indicating a status of payment card approval.

4. The seat according to claim 1, further comprising printed instructions for providing guidance in obtaining access to the PC card.

5. The seal according to claim 1, further comprising a plurality of payment card readers and recessed portions.

6. The seat according to claim 1, wherein the PC card is a wireless Personal Computer Memory Card International Association (PCMCIA) Local Area Network (LAN) card for use with a portable computer to access the system on-board the aircraft.

7. A method at providing a Personal Computer (PC) card for use with portable electronic devices to access a system on-board a mobile platform, the method comprising steps of:

accepting payment in order to obtain the PC card, the payment provided using a payment card;

processing the payment card to authorize use of the PC card;

providing the PC card for use in accessing the system on-board the mobile platform upon approval of the payment card, the PC card having stored therein configuration information for use by the portable electronic device to allow access to the system on-board the mobile platform through the PC card;

retaining the payment card until the PC card is returned; and releasing the payment card upon return of the PC card.

8. The method according to claim 7, further comprising indicating approval of the payment card.

9. The method according to claim 7, further comprising providing instructions relating to accessing the PC card.

10. The method according to claim 7, wherein the steps are implemented as an assembly on an aircraft seatback.

11. A seat on a mobile platform adapted for providing a Personal Computer (PC) card for use with a portable computer to access a system on-board the mobile platform, the seat comprising:

a payment card reader on a back of the seat br approving a payment card inserted therein to obtain access to the PC card and adapted to hold the payment card until the PC card is returned; and a slot for receiving and holding therein the PC card on the back of the seat, the slot configured for lacking the PC card therein and resisting access to the PC card until the payment card is approved, the PC card having stored therein configuration information for use by the portable computer to allow access with the portable computer to the system on-board a mobile platform through the PC card.

12. A system on-board a mobile platform providing communication using portable computers, the system comprising:

a plurality of seats within the mobile platform;

an assembly provided on a back of one or more of the plurality of seats, the assembly securedly holding therein a Personal Computer (PC) card and having a payment card reader for approving a payment card inserted therein to obtain access to the PC card and holding the payment card until the PC card is returned, the PC card having stored therein configuration information for use in accessing the system on-board the mobile platform through the PC card; and at least one PC card adapted to be connected to a portable computer to provide communication with the system on-board the mobile platform using the configuration information, at least some of the configuration information being downloaded to the portable computer.

* * * * *